US010558429B2

(12) United States Patent
Serrano et al.

(10) Patent No.: US 10,558,429 B2
(45) Date of Patent: Feb. 11, 2020

(54) SWITCHING MATRIX REPRESENTATION FOR AN INCREMENTAL ALGORITHM COMPUTING CONNECTED COMPONENTS

(71) Applicant: International Business Machines Corporation, Armonk, NY (US)

(72) Inventors: Mauricio J. Serrano, Bronx, NY (US); Ilie Gabriel Tanase, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 718 days.

(21) Appl. No.: 15/245,463

(22) Filed: Aug. 24, 2016

(65) Prior Publication Data

US 2018/0060038 A1 Mar. 1, 2018

(51) Int. Cl.

| | |
|---|---|
| ***G06F 17/30*** | (2006.01) |
| ***G06F 7/20*** | (2006.01) |
| ***G06F 16/901*** | (2019.01) |
| *G06F 16/951* | (2019.01) |
| *G06F 16/35* | (2019.01) |
| *G06F 16/28* | (2019.01) |

(52) U.S. Cl.

CPC ............ *G06F 7/20* (2013.01); *G06F 16/9024* (2019.01); *G06F 16/285* (2019.01); *G06F 16/355* (2019.01); *G06F 16/951* (2019.01)

(58) Field of Classification Search

CPC .. G06F 16/951; G06F 16/9024; G06F 16/355; G06F 17/10; G06F 16/22; G06F 16/24578; G06F 16/285; G06F 16/35

USPC ................................ 707/625, 637, 748, 791

See application file for complete search history.

(56) References Cited

U.S. PATENT DOCUMENTS

| | | | |
|---|---|---|---|
| 7,089,275 | B2 | 8/2006 | Garg |
| 8,527,571 | B2 | 9/2013 | Gustavson et al. |
| 8,612,723 | B2 | 12/2013 | Burkhart et al. |
| 8,775,495 | B2 | 7/2014 | Lumsdaine et al. |

(Continued)

FOREIGN PATENT DOCUMENTS

| | | |
|---|---|---|
| CN | 102033854 A | 4/2011 |

OTHER PUBLICATIONS

Siek, et al., "Incremental Connected Components," Boost Graph Library: Incremental Connected Components—1.61.0, Downloaded from the Internet: Jun. 15, 2016, 4 pages.

(Continued)

*Primary Examiner* — Dangelino N Gortayo

(74) *Attorney, Agent, or Firm* — Amin, Turocy & Watson, LLP

(57) ABSTRACT

Techniques for determining connected components of a graph via incremental graph analysis algorithms are provided. In one example, a computer-implemented method comprises analyzing, by a system operatively coupled to a processor, a first differential value representing an initial incremental difference of elements between selected initial elements of an initial vector and selected input elements of an input vector associated with a graph. The method further comprises recurringly analyzing, by the system, a second differential value representing a subsequent incremental difference of elements between selected updated elements of an updated initial vector and selected additional elements of another input vector associated with the graph until the second differential value is zero.

20 Claims, 10 Drawing Sheets

800

ANALYZING, BY A SYSTEM OPERATIVELY COUPLED TO A PROCESSOR, A FIRST DIFFERENTIAL VALUE REPRESENTING AN INITIAL INCREMENTAL DIFFERENCE OF ELEMENTS BETWEEN SELECTED INITIAL ELEMENTS OF AN INITIAL VECTOR AND SELECTED INPUT ELEMENTS OF AN INPUT VECTOR ASSOCIATED WITH A GRAPH — 802

EMPLOYING, BY THE SYSTEM, A FIRST VERSION OF THE ANALYSIS TOOL TO PERFORM A MATRIX-VECTOR MULTIPLY OPERATION ON THE FIRST DIFFERENTIAL VALUE AND A FIRST MATRIX VALUE REPRESENTING A FIRST SELECTION OF MATRIX ELEMENTS OF A MATRIX — 804

RECURRINGLY ANALYZING, BY THE SYSTEM, A SECOND DIFFERENTIAL VALUE REPRESENTING A SUBSEQUENT INCREMENTAL DIFFERENCE OF ELEMENTS BETWEEN SELECTED UPDATED ELEMENTS OF AN UPDATED INITIAL VECTOR AND SELECTED ADDITIONAL ELEMENTS OF ANOTHER INPUT VECTOR ASSOCIATED WITH THE GRAPH UNTIL THE SECOND DIFFERENTIAL VALUE IS ZERO — 806

(56) References Cited

U.S. PATENT DOCUMENTS

| | | | | |
|---|---|---|---|---|
| 9,251,157 | B2 * | 2/2016 | Frieden | G06F 16/1734 |
| 9,436,760 | B1 * | 9/2016 | Tacchi | G06F 16/367 |
| 2008/0010329 | A1 | 1/2008 | Kuwada | |
| 2008/0313168 | A1 * | 12/2008 | Liu | G06F 16/951 |
| 2010/0306158 | A1 * | 12/2010 | Andersen | G06F 17/10 706/52 |
| 2014/0343899 | A1 * | 11/2014 | Ashcraft | G06F 17/5018 703/1 |
| 2015/0379054 | A1 * | 12/2015 | Kernert | G06F 17/16 707/625 |
| 2016/0179923 | A1 * | 6/2016 | Chehreghani | G06F 16/285 707/637 |

OTHER PUBLICATIONS

Buono, et al., "Optimizing Sparse Linear Algebra for Large-Scale Graph Analytics," IEEE Xplore Digital Library, Aug. 2015, 2 pages, (vol. 48 , Issue: 8).

Kusum, et al., "Efficient Processing of Large Graphs via Input Reduction," Last Accessed: Aug. 18, 2016, 13 pages.

Kang, et al., "PEGASUS: A Peta-Scale Graph Mining System—Implementation and Observations", ICDM 2009, Ninth IEEE Int. Conf., pp. 229-238.

Zhang, et al., "i2MapReduce: Incremental Iterative MapReduce," Last Accessed: Aug. 18, 2016, 4 pages.

* cited by examiner

SWITCHING MATRIX REPRESENTATION FOR AN INCREMENTAL ALGORITHM COMPUTING CONNECTED COMPONENTS

BACKGROUND

The subject disclosure relates to determining connected components of a graph via incremental graph analysis algorithms.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate determining connected components of a graph via incremental graph analysis algorithms are described.

According to an embodiment, a system is provided. The system comprises a memory that stores computer executable components; and a processor that executes the computer executable components stored in the memory. The computer executable components can comprise a determination component that determines graph data using a determination tool that performs a matrix-vector multiply operation on a first value of a temporary vector and a second value of a matrix, wherein the first value represents first difference data between selected first data of an initial vector and selected second data of an input vector. The computer executable components can also comprise a recurring determination component that continuously determines additional graph data using the determination tool that performs the matrix-vector multiply operation on a third value of another temporary vector and the second value of the matrix, wherein the third value represents second difference data between selected third data of an updated initial vector and selected fourth data of a subsequent input vector until the third value is zero.

In another embodiment, a computer-implemented method is provided. The computer-implemented method can comprise analyzing, by a system operatively coupled to a processor, a first differential value representing an initial incremental difference of elements between selected initial elements of an initial vector and selected input elements of an input vector associated with a graph. The computer-implemented method can also comprise recurringly analyzing, by the system, a second differential value representing a subsequent incremental difference of elements between selected updated elements of an updated initial vector and selected additional elements of another input vector associated with the graph until the second differential value is zero.

According to yet another embodiment, a computer program product for efficiently applying matrix representation is provided. The computer program product can comprise a computer readable storage medium having program instructions embodied therewith. The program instructions can be executable by a processor to cause the processor to determine connected elements of a graph using a determination tool that performs a matrix-vector multiply operation on a first set of values of an intermediate vector and a second set of values of a matrix, wherein the first set of values represent a first incremental difference between selected first elements of a first vector and selected second elements of a second vector. The program instructions can also be executable by the processor to cause the processor to iteratively determine additional connected elements of the graph using the determination tool that performs the matrix-vector multiply operation on a third set of values of another intermediate vector and the second set of values of the matrix, wherein the third set of values represent a second incremental difference between selected updated elements of an updated first vector and selected third elements of a third vector, and wherein the iterative determination is performed until the third set of values satisfy a defined condition.

DETAILED DESCRIPTION

Figure 1:
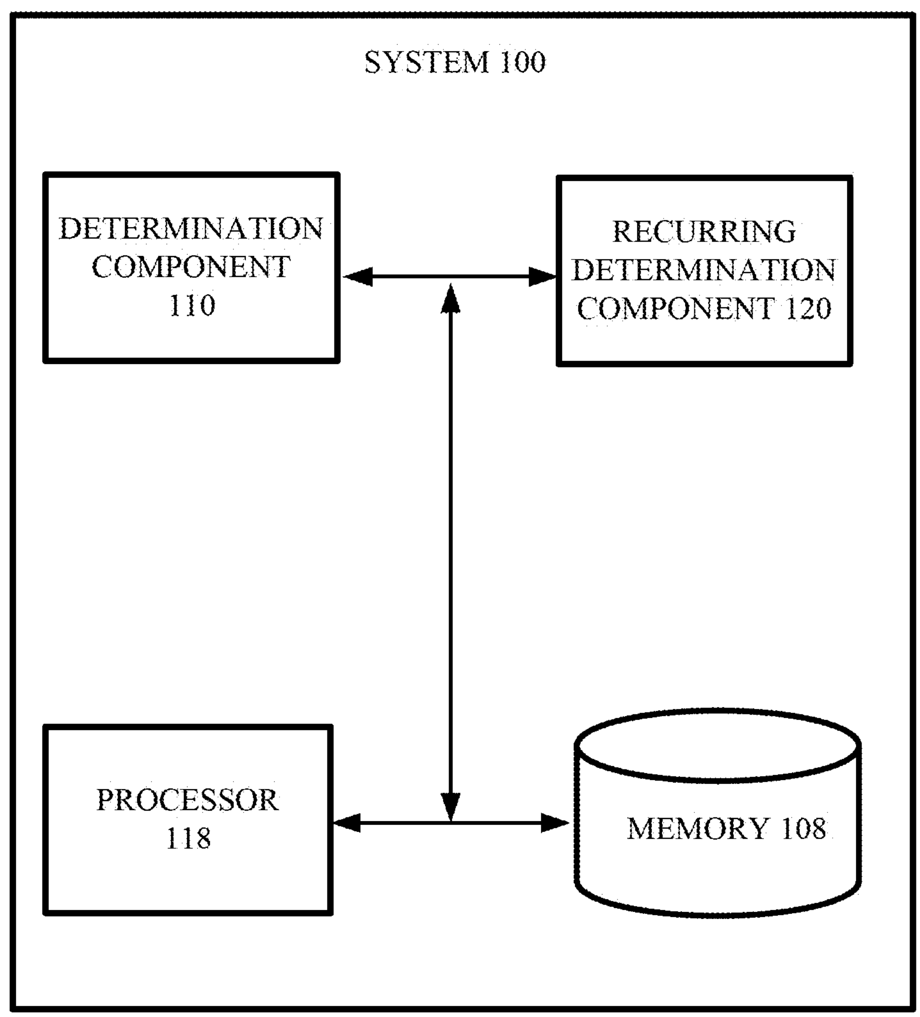
FIG. 1 illustrates a block diagram of an example, non-limiting system that facilitates determining connected components of a graph using incremental difference data.

The following detailed description is merely illustrative and is not intended to limit embodiments and/or application or uses of embodiments. Furthermore, there is no intention to be bound by any expressed or implied information presented in the preceding Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With the rise of digital platforms and the ability of users, entities, and groups to socialize, communicate and transact over digital mediums via the Internet, users around the world can interact with one another in a variety of areas. As such, the connectivity and interactions between businesses, people, accounts, devices, parties, and other such entities can be represented by a voluminous quantity of data. The data from such interactions can provide insight into pertinent information related to various entities within a network and such information (e.g., information representing a relationship between parties) can be codified, visualized, and analyzed within respective networks. A relevant technique to analyze such relationships is via graph analytics, which leverages graph structures to understand relationships that exist between people, devices, or entities within a network.

A graph can be a structure modeled on pairwise relationships between connected vertices (e.g., people, objects, actors, agents, nodes, points, etc.) and edges (e.g., ties between people, objects, actors, agents, nodes, points, etc.). Graphs can provide information regarding the attributes of various relationships such as the strength or direction of a relationship. The connectivity of vertices within a graph can at times be highly irregular such that one or more connected vertex of a graph can have neighboring vertices with distinct degrees. Accordingly, accessing large subsets of graph nodes or edges for graph analysis can induce memory access patterns with poor spatial or temporal locality in a system memory. For instance, an irregular connected component graph can present challenging memory access patterns and are often inefficiently executed in modern processor architectures. Consequently, requests for data associated with irregular graphs often cause cache misses, address translation misses, and component execution delays, which can lead to poor performance.

The subject disclosure is directed to computer processing systems, computer-implemented methods, apparatus and/or computer program products that facilitate efficiently, effectively, automatically (e.g., without direct human involvement), and incrementally providing graph analytic solutions that facilitate efficient accessing of data in one or more memory and efficient execution of graph analytics components by one or more processors. For example, incremental graph analytics can include accessing incremental subsets of graph nodes or edges associated with connected component graphs to reduce an overall time required to perform determinations and identification tasks of connected components in a graph.

Finding connected components in a graph can involve performing analytics on large amounts of data. For instance, large amounts of graph data can be generated from social network platforms, homeland security data systems, financial systems, and targeted marketing systems and such data can represent numerous entities, messages, or information requiring graph analysis. Analyzing such large quantities of data requires a great expenditure of time. The importance of determining connections and relationships between data within a graph should not be understated. For instance, connections and relationships can be employed to solve graph analytics problems such as identifying relationships between large sets of data.

One or more aspects described herein can utilize an incremental method for identifying connected components of a graph. By utilizing incremental data associated with a difference between a previous connected component solution and a new connected component solution and comparing such difference to input data of an input vector, the determination of a totality of connected components of a graph can be accomplished with significant efficiencies. The comparison of large volumes of data associated with a new connected component solution to large volumes of data associated with the previous connected component solution can be ideal for early iterations of analysis where many changes are determined between large sets of data.

However, in embodiments described herein, during later iterations of analysis where only a few changes are determined between connected component solutions, a comparison and access of data between an input vector and a difference vector that represents incremental differences in information between the two large solution vectors can contribute to the determination of a final solution (e.g., identification of all connected components in a graph) to a graph analysis inquiry. The process can iteratively analyze incremental subsets of data rather than entire sets of voluminous data during one or more iterations of analysis. Thus, to determine new connected components in a graph, the information that has changed between solutions from a previous iteration of graph analysis can be compared to a current input vector to determine new connected components.

Furthermore, the results of one or more previously conducted iterations of analysis can be added to the connected component solution for use in the subsequent analysis with another input vector. As the iterations of analysis progress, the system can perform more efficient and timely analysis of data (e.g., recurring analysis with greater precision and faster results) and as the incremental graph analysis process continues, the difference data between one or more previous vector solution and current vector solutions can decrease until a particular condition is met (e.g., no difference is determined between a previous connected component solution and a new connected component solution). Thus indicating there is no difference between elements of a current vector solution and a previous vector solution such that all the connected components of the graph have been identified.

In an aspect, the system can also facilitate the achievement of processing and memory access efficiencies by utilizing a switching mechanism to switch between graph analysis algorithms well suited to analyze large amounts of data to incremental graph analysis algorithms well suited to analyze lower volumes of data such as incremental changes in connected component solutions. Accordingly, an aspect of the system can allow for switching from a brute force analysis algorithm (e.g., algorithm to analyze the entire set of elements between an initial connected component vector and a current connected component vector) to an incremental analysis algorithm. Accordingly, the matrix-vector multiply tasks and matrix representation formats can be switched during the graph analysis process based on density characteristics of input vectors and/or the matrix. In an aspect, matrix-vector multiplication can include multiplying a matrix by a vector) and reduction operations.

For instance, early iterations of graph analysis can often yield a greater number of differences between initial connected component vectors and resultant connected component vectors. This large volume of determined differences between vectors represents that early iterations of graph analysis can result in the determination of more connected component elements as corresponds to analyzing large volumes of data. However, as the iterations of analysis progress, the number of new connected components determined can be reduced dramatically. Thus, during later iterations of the graph analysis process, the difference between initial connected component vectors and resultant connected component vectors can be compared to new input vectors to determine new connected components of the graph rather than the entire volume of data associated with initial connected component vectors and resultant connected component vectors.

As such, in embodiments described herein, a brute force algorithm that analyzes large amounts of data can be relevant for the early stages of the connected component analysis. However, the system, as disclosed herein, can switch to an incremental connected component analysis during later iterations of the analysis, such that selected portions of the solution vector (e.g., the difference between an initial connected component vector and a solution connected component vector) can be compared to a new input vector. Consequently, the switching between large data volume analysis algorithms to incremental data analysis algorithms can allow for particular matrix-vector multiply tools to be utilized at earlier stages of the graph analysis process and other matrix-vector multiply tools to be utilized at later stages of the graph analysis process.

The computer processing systems, computer-implemented methods, apparatus and/or computer program products employ hardware and/or software to solve problems that are highly technical in nature (e.g., related to identification of connected components of a graph), that are not abstract and that cannot be performed as a set of mental acts by a human. For example, a human, or even thousands of humans, cannot efficiently, accurately and effectively manually analyze the voluminous amounts of graph data shared via respective graph data sources (e.g., social network platforms, financial service platforms, government data platforms, corporate marketing data platforms) through the Internet daily to identify graph relationships between nodes, connected components, and large sets of data.

One or more embodiments of the subject computer processing systems, methods, apparatuses and/or computer program products can enable the automated determination of connected components of a graph in a highly accurate and efficient manner By employing an operation to determine connected components in a graph using incremental difference data between initial and current vector solutions, the processing time and/or accuracy associated with executing components that analyze graph data and accessing graph data for analysis can be substantially improved. Furthermore, one or more embodiments of the subject techniques can facilitate automatically and/or accurately identifying connected components of a graph. For example, a graph comprising a set of elements (e.g., vertices, edges) that are directly connected (e.g., a vertex connected to two edges) or connected by a path can be determined using graph analytics techniques disclosed herein.

Accordingly, the graph analytics techniques can determine communities of interest or common activities between various entities within a community. Also, in an aspect, the relationships represented by a graph cannot be observed or inferred by mere human inspection and require analysis of heuristics, data dimensions, voluminous sets of graph and non-graph data, and other such non-human forms of analysis. For example, in a non-limiting embodiment, the system can switch between determination tools used for analysis of data based on the density of data associated with a vector and/or the density of data to be accessed from a matrix during the analysis. A human cannot perform the detailed and technical estimations of vector and matrix densities as well as perform such estimations iteratively.

Furthermore, one or more embodiments of the computer processing systems, computer-implemented methods, apparatuses and/or computer program products facilitate switching between a determination tool capable of analyzing voluminous sets of comprehensive data to another determination tool that analyzes targeted sets of data, where the switching is based on an estimated density of an input vector. In an aspect, a vector can be characterized as sparse or dense. A sparse vector can be a vector comprised of mostly zero values and storing such sparse vectors in a large one dimensional array can be inefficient for both processing and storage purposes. Similar to a sparse vector, an array or matrix comprised of mostly zero elements can be referred to as a sparse matrix. In contrast, a vector or a matrix comprised of mostly nonzero elements can be referred to as dense vectors and dense matrices respectively. In an aspect, the determination tool used in analyzing graph data can be switched based on the density or sparsity of a vector and/or a matrix.

For example, in response to a density of input vector data for analysis changing from dense to sparse, one or more embodiments of the computer processing systems, computer-implemented methods, apparatuses and/or computer program products can automatically switch from determining the connected components of a graph using a determination tool (e.g., brute force data analysis tools) that efficiently analyzes large volumes of data to a determination tool that efficiently analyzes smaller volumes of data (e.g., incremental data analysis tools). Thus, the capability of switching between graph analysis tools facilities the efficient determination of graph data from large volumes of analyzed data (e.g., in early recurring stages of data analysis) to smaller volumes of analyzed data (e.g., in later recurring stages of data analysis) representing incremental changes to graph data.

Turning now to FIG. 1, illustrated is a block diagram of an example, non-limiting system 100 that facilitates a determination of connected components of a graph using incremental graph analytics in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As shown in FIG. 1, illustrated is an example, non-limiting embodiment of system 100 that can determine connected components of a graph using determination component 110 and recurring determination component 120. In an aspect, system 100 components can also include or otherwise be associated with at least one memory 108 that stores computer executable components (e.g., computer executable components can include, but are not limited to, determination component 110, recurring determination component 120, and associated components) and/or can store computer instructions for performing one or more functions of determination component 110 and/or recurring determination component 120. The system components can also include or otherwise be associated with at least one processor 118 that can executes the computer executable components and/or computer instructions stored in memory 108.

In an aspect, determination component 110 can determine connected elements or components of a graph. A graph or large scale free graph can be a representative model of data, such as a model representing individual entities and their relationships. In an aspect, a graph can include a set of elements referred to as "vertices" together with a set of edges, where the vertices (e.g., nodes, points) can represent actors, agents, parties, or other such entities, and the edges (e.g., lines, links, arcs, etc.) can represent a tie or relationship between various actors, agents, or other such entities. The system 100 can execute (e.g., using processor 118) components to determine (e.g., using determination component 110) and identify data corresponding to a graph. Typically, graph processing techniques process large volumes of data using appropriate graph analysis tools (e.g., brute force algorithms) to identify connected components of a graph.

However, even while using appropriate graph analysis tools, the processing of large amounts of data can often be an inefficient and time consuming endeavor. Furthermore, the early iterations of graph analysis performed on large sets of data correspond to an identification of large volumes of graph data (e.g., a determination of many graph elements from the data) that contribute to a sought after graph solution. Thus, one or more solution vector resulting from early iterations of data analysis to new input vectors result in a greater number of connected components of the graph being determined.

However, as various iterations of analysis progress, the additional graph elements or connected components determined (e.g., using determination component 110) from analyzed input data can become less. As such, determination component 110 can utilize incremental changes in data from one or more iteration of analysis for comparison to input data in order for recurring determination component 120 to determine connected components of a graph iteratively.

Thus, in some embodiments, determination component 110 can include or be communicatively coupled to a determination tool (not shown) that can determine graph elements that can facilitate the analysis of data where a defined number of changes between previously analyzed data and new input data occur. The defined number of changes can be a number of changes less than a particular threshold, for example. In an aspect, determination component 110 can employ the determination tool to perform a matrix-vector multiply operation on a set of data that represents a difference between selected first data of an initial vector and selected second data of an input vector. In an aspect, difference data can refer to the difference in elements between a previously determined connected component vector (e.g., a solution connected component vector from a previous iteration of analysis) and a recently determined connected component vector (e.g., a solution connected component vector from a current iteration of analysis).

The difference in data between the two connected component solution vectors can represent additional connected components determined between an iteration of analysis comparing the previous connected component solution vector to an input vector. Furthermore, the incremental difference in data between solution vectors can become incrementally small in later stages of graph analysis where the majority of connected components have already been determined from iteratively analyzing large volumes of data. As such, in later iterations of data analysis for graph components, large volumes of data need not be analyzed for new connected components. Instead, determination component 110 can analyze incremental differences in data between a current solution vector and previous solution vector for comparison to an input vector to determine additional connected components of a graph.

Furthermore, in some embodiments, the difference data can be associated with the creation of a defined or minimal number of non-zero elements and/or can be stored in a vector used for a matrix-vector multiplication operation performed by the determination tool. By reducing the number of non-zero elements, the determination tool can quickly perform the matrix-vector multiply operation in a shorter period of time, using less operations, and requiring less resource allocation than required to perform such operation on a greater number of non-zero elements. Consequently, the system 100 can facilitate less consumption of power for executing the components and provide fast and efficient access to data (e.g., such as difference data) from memory 108.

In another aspect, although determination component 110 can employ a determination tool to determine additional connected components using incremental data that contribute to the determination of a graph solution, in some embodiments, the determination component 110 can also determine additional connected components using large volumes of non-incremental data (e.g., during early iterations of graph analysis processes). In an aspect, a determination component 110 can utilize an initialized vector of connected components also referred to as an "input vector" to determine connected components contributing to a final graph solution. In an aspect, one or more elements of the input vector can be assigned a unique identifier representing a node position plus a value of one, such that the input vector can be composed of all positive numbers (e.g., non-zero, positive values).

Furthermore, the determination component 110 can employ a version of the determination tool that can implement a matrix-vector multiply operation in accordance with a connected component algorithm well suited for analyzing large volumes of data (also referred to as the "brute force algorithm"). For instance, the matrix-vector multiply operation of the brute force algorithm can be performed using {MIN, *} semi-ring rules. A {MIN, *} semi-ring rule can be a set of two binary operations comprising a MIN operation (which can be an operation that outputs a minimum value of a set) and a product operation. While determination component 110 can employ a version of the determination tool that utilizes a brute force algorithm to determine connected components of a graph, in an aspect, determination component 110 and/or recurring determination component 120 can determine additional connected components based on incremental difference data between a predicate vector and an initial connected component vector. For instance, in some embodiments, the determination component 110 and/or recurring determination component 120 can implement the below incremental connected component algorithm:

ALGORITHM (1)

```
Line 01: cc[i] = i+1, i=0, N-1 (Line 01 represents an initial vector of connected components)
Line 02: p = 1 (Line 02 represents an initial vector of difference data)
Line 03: do {
Line 04:     q = (p[i] ==0) ? q[i]:cc[i], i=0...N-1 // optimized copy operation
Line 05:     t = q * p
Line 06:     t' = A* {MIN, *}t
Line 07:   cc = MIN(t',cc)
Line 08:     p = (q!=cc)
Line 09: } while (p!=0)
```

In an aspect, an initialized vector of connected components (referred to as "cc[i]" in line 01) can be assigned a unique identifier representing a value associated with a node position plus a value of one (referred to as "i+1" in line 01), such that the initialized vector can be composed of all positive numbers. In another aspect, a predicate vector (referred to as "p" in line 02) can be initialized with all elements set to one, which represents a difference between the initialized connected component vector (referred to as "cc[i]" in line 04) and a copy of the initialized connected component vector stored in another vector (referred to as "q" in line 04).

Accordingly, a copy of the initialized vector (cc[i]) can be stored in another vector (referred to as "q" in line 04) using the difference vector (referred to as "p" in line 02) to facilitate the copy operation. Pursuant to determination component 110 or recurring determination component 120 employing a version of the determination tool that implements the incremental connected component algorithm (algorithm 1), the incremental differences (e.g., differences between cc[i] and q) become fewer and fewer as the analysis iteratively progresses. Subsequently, determination component 110 can determine a temporary vector (referred to as "t" in line 05) to include only the elements of the initialized vector (cc[i]) that have changed, which is represented as the product between the another vector (q) and the predicate vector (p). The temporary vector can then be updated (referred to as "t" in line 06) based on the performance of the matrix-vector multiply operation between the matrix (represented as "A" in line 06) and the minimum of the temporary vector (t). Furthermore, determination component 110 can determine the connected component vector (represented as "cc" in line 07) as the minimum result of the updated temporary vector (referred to as "t" from line 06) and the connected component vector (referred to as "cc" in line 01). The determination component 110 can determine the predicate vector (referred to as "p" in line 08) as the difference between the connected component vector (referred to as "cc" in line 07) and a copy of the initialized connected component vector stored in another vector (referred to as "q" in line 04). Furthermore, recurring determination component 120 can iteratively perform the determination analysis so long as the predicate vector (p) is comprised of at least one bit set (e.g., a set of live variables representing graph elements).

Upon the predicate vector (p) having no bit sets (no live variables or graph elements are present), the determination component 110 can cease to perform determining of graph components. A predicate vector having no bit sets can indicate that no difference exists between the current connected component vector (cc) and the previous connected component vector expressed in a copy within another vector (q) thus demonstrating that a final solution of graph components has been achieved. However, if determination component 110 can determine the predicate vector (referred to as "p" in line 08) to have a non-zero value then recurring determination component 120 can perform the incremental graph analysis operations recurringly until the predicate vector (p) is zero. Thus, if the predicate vector (p) is zero, a copy of the updated connected component vector (referred to as "cc" in line 07) can be stored in another vector (referred to as "q" in line 04). As iterations progress to determine graph data, the incremental differences between the updated input vector (referred to as "cc" in line 07) and the copy of the previous input vector (referred to as "q" in line 04) can become fewer until eventually reaching zero.

Upon the predicate vector (p) equaling zero then, in some embodiments, no difference exists between an updated input vector (referred to as "cc" in line 07) and a copy of the previous input vector (referred to as "q" in line 04). Accordingly, the recurring determination component 120 in connection with determination component 110 can be considered to have determined all the connected components of the graph at such time. Alternatively, given the result of a predicate vector (p) having a non-zero difference, then recurring determination component 120 can determine a temporary vector that includes only the elements of the newly updated input vector that have changed between the newly updated input vector and the previous connected component vector. In another aspect, the recurring determination component 120 can employ a determination tool that utilizes the matrix-vector operation for only those elements that have changed in the newly updated input vector. The newly updated input vector can then be updated with the minimum result of the temporary vector. The recurring determination component 120 can subsequently determine a new predicate vector (p) as the difference between the newly updated connected component vector and a copy of the previous connected component vector. Upon the new predicate vector being zero the recurring determination component 120 can cease to determine graph connected components.

Figure 2:
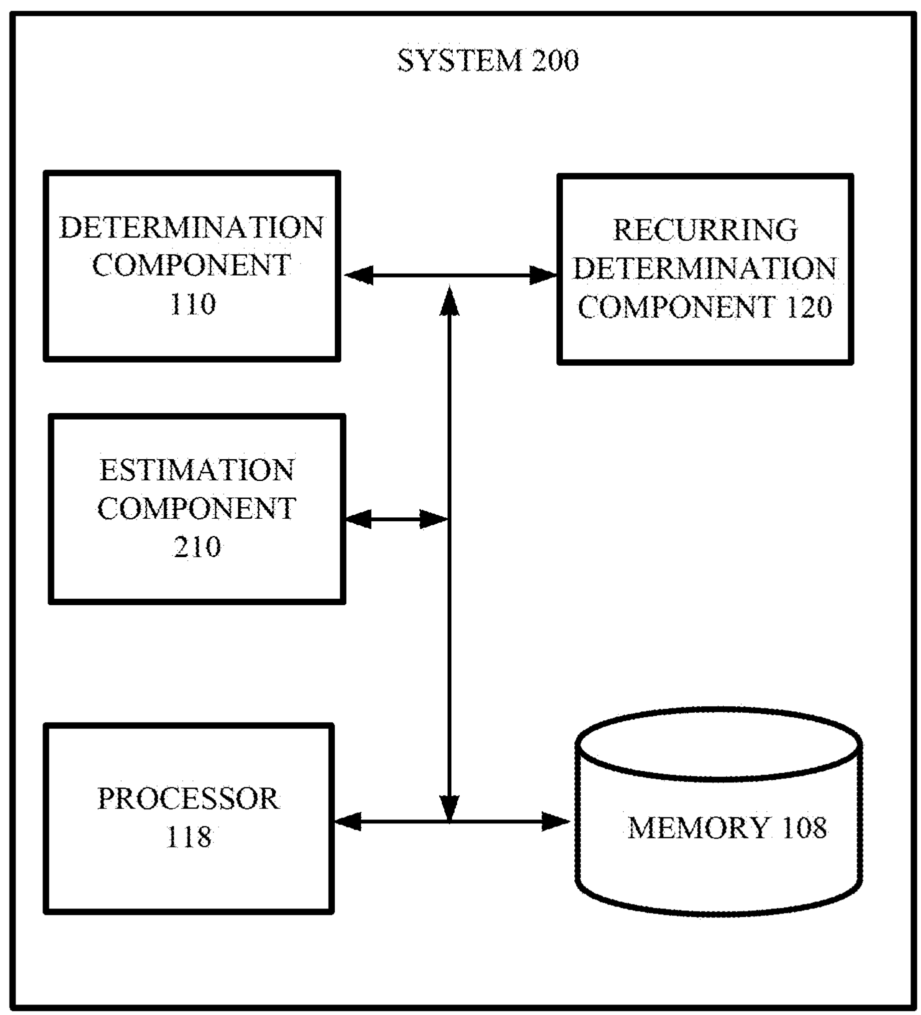
FIG. 2 illustrates another block diagram of an example, non-limiting system that facilitates estimating a vector density value in accordance with one or more embodiments described herein.

Turning now to FIG. 2, illustrated is system 200 in which connected components of a graph can be determined using incremental difference data (e.g., incremental differences between a connected component vector (cc) and the copy of a previous input vector (q)) in accordance with one or more embodiments described herein. Repetitive description of like elements employed in other embodiments described herein are omitted for sake of brevity.

The system 200 can comprise determination component 110, recurring determination component 120, and estimation component 210 that estimates a vector density value representing a vector density of the third vector (e.g., input vector), wherein the vector density represents a number of non-zero values associated with the third vector as a function of a number of elements represented by the selected third data.

In accordance with a non-limiting embodiment, determination component 110 can utilize a brute force graph algorithm to facilitate performance of a matrix-vector multiply operation on a matrix and an input vector, however the operation can consume much time and resources to perform depending on the characteristics associated with the input vector and/or matrix. For example, if an input vector is estimated to be sparse (e.g., few of the vector elements are non-zero), a Compressed-Sparse-Column (CSC) matrix-vector multiply operation can provide regular access to sparse input vectors and matrix arrays stored in CSC storage formats thus facilitating processor 118 to execute efficient streaming performance tasks for accessing matrix arrays. As such, the determination tool can perform the matrix-vector multiply operation using any of a range of matrix-vector multiply operations and/or storage formats capable of facilitating enhanced performance of the system (e.g., faster access to data in memory 108, faster execution of system 100 components by processor 118) based on an estimation (e.g., using estimation component 210) of the sparsity of the input vector.

In another instance, the vector-multiply operation can use a CSC storage format to perform the matrix-vector multiply operation, however, such format provides for poor system performance when determining a resultant product of a sparse matrix and a dense vector due to one or more item possessing random access patterns (e.g., affecting cache and memory 108 related performance). Instead, the determination component 110 can use a Compressed-Sparse-Block (CSB) matrix-vector multiply operation that provides run-time efficiencies for dense vectors and matrices represented by CSB storage formats. In yet another instance, determination component 110 can employ a CSC matrix-vector operation where the temporary vector (referenced as "t" in line 06 and also referred to as an input vector) representing difference data between connected component vectors is sparse.

Furthermore, in an instance, determination component 110 in connection with estimation component 210 can employ a checking mechanism to estimate (e.g., using estimation component 210) whether the input vector is sparse (e.g., a few elements are different from zero) and accordingly determine whether to utilize a CSC-based determination tool to facilitate determination of connected components. If the estimation component 210 estimates that the input vector (t) is sparse, then in some embodiments, the determination component 110 or recurring determination component 120 can implement the following masked matrix-vector multiply algorithm using CSC representation:

ALGORITHM (2)

```
Line 01: for (i = 0; i<number of cols ; i++) {
Line 02:     if (input vec[i]))
Line 03:         for (j=numEdges[i]; j <numEdges [i+1]; j++)
Line 04:             output vec[endV[j]] += input vec [i] * weight[j]
```

In an aspect, a check can be performed in line 02 on the input vector (referenced as "input vec [i]") to determine whether the input vector is very sparse. If the vector is determined to be sparse in line 02, then access to many of the non-zero elements in the update to the output vector (referenced as "output vec" in line 04) that occurs in line 04 and in the matrix comprising numEdges, endV, and weight can be avoided using the CSC matrix storage format for a sparse vector. The CSC storage format for matrices can use three arrays (e.g., numEdges, endV, and weight) where the numEdges (referenced as "numEdges" in line 03) can be an array of size equal to the number of columns of the matrix (referenced as "number of cols" in line 01) plus 1, and it contains offsets into arrays endV (referenced as "endV[j]" in line 04) and weight (referenced as "weight" in line 04). The array endV can be the index of non-zero row entries for one or more column and the array weight can be the actual non-zero entries. Thus, by utilizing a matrix represented in a CSC storage format, the matrix-vector multiply operation can avoid accessing many of the non-zero access elements in the matrix and during an update to the output vector.

Furthermore, using a CSC-based determination tools for dense vectors presents potential data access issues related to the updated vector resulting from the matrix-vector multiply operation due to irregular read operations associated with data gathering tasks followed by irregular write-back operations associated with data scattering tasks. Additionally, attempts by the system to perform address translation tasks can present issues in many processor architectures that store (in cache) a limited number of translation entries in a translation look-ahead buffer or other-such buffer. As such, a determination tool using a CSC format can present high-latency memory data access issues when used in connection with dense vectors. Thus, a check can be performed by estimation component 210 to estimate the density of a vector before determination component 110 employs a particular type of determination tool (e.g., CSC-based or CSB-based efficient determination tool).

In accordance with the estimation component 210 estimating the density or sparsity of an input vector used in the matrix-vector multiply operation, such estimate can be compared to a threshold density. If the estimation component 210 estimates a high density of the input vector compared to the threshold density, then a CSB version of the determination tool can be utilized to perform the matrix-vector multiply operation on a matrix represented in a CSB format to facilitate data processing and accessing efficiencies. As used herein, a density can be determined to be "high" if the density is greater than a defined value. If the estimation component 210 estimates a low density of the input vector compared to a threshold density, then a CSC version of the determination tool or a masked matrix-vector multiply operation can be performed on a matrix represented in a CSC format to facilitate efficient data processing and data accessing operations by processor 118 and memory 108 respectively. As used herein, a density can be determined to be "low" if the density is less than (or, in some cases, equal to) a defined value.

In another aspect, estimation component 210 can also use the input vector density estimation to estimate the number of non-zero data points accessed from the matrix (e.g., an adjacency matrix represented in CSC or CSB format) for performing the matrix-vector multiply operation on an input vector. For instance, the density of an input vector can be estimated using a measurement of the input vector from the measured density of a predicate vector (referenced as "p" in line 05 of Algorithm 1). Accordingly, the input vector density can be estimated to be the result of a number of non-zero data points of the predicate vector (p) divided by the number of elements of the predicate vector (p). In an aspect, estimation component 210 can estimate an input vector density and determination component 110 or recurring determination component 120 can facilitate a determination of the most efficient determination tool to be used for performing the matrix-vector multiply operation. However, in the event a distribution of data is skewed or uneven in the matrix, then determination component 110 can rely on vector estimates from estimation component 210 and other factors in determining which determination tool (e.g., CSC-based or CSB-based determination tool) to employ.

Thus, where a matrix presents a skewed distribution of data, (e.g., some rows include few matrix elements and other rows include many matrix elements), estimation component 210 can also estimate a number of zeros accessed from the adjacency matrix by utilizing the non-zero elements corresponding to the input vector. For instance, estimation component 210 in connection with determination component 110 can estimate the number of non-zero matrix elements accessed by adding the number of non-zero elements corresponding to the input vector used by the determination tool in the vector-matrix multiply operation.

In an aspect, the data associated with the input vector (p) can be compared to a vector initialized to zero. In the event a data point in any column of the input vector (p) is a non-zero value, then a number of corresponding non-zero elements associated with the matrix are added to the input vector (p) non-zero elements. The estimation component 210 can utilize the result of the comparison to provides an estimate of the memory footprint (e.g., an estimate of the number of non-zeros accessed from the adjacency matrix) to be created using the vector-multiply operation. Accordingly, estimation component 210 can utilize this estimation mechanism if data within the matrix presents a skewed distribution. This estimation technique can be performed (e.g., using estimation component 210) efficiently in modern computing architectures due to the sequential access patterns associated with the adjacency matrix arrays.

Figure 3:
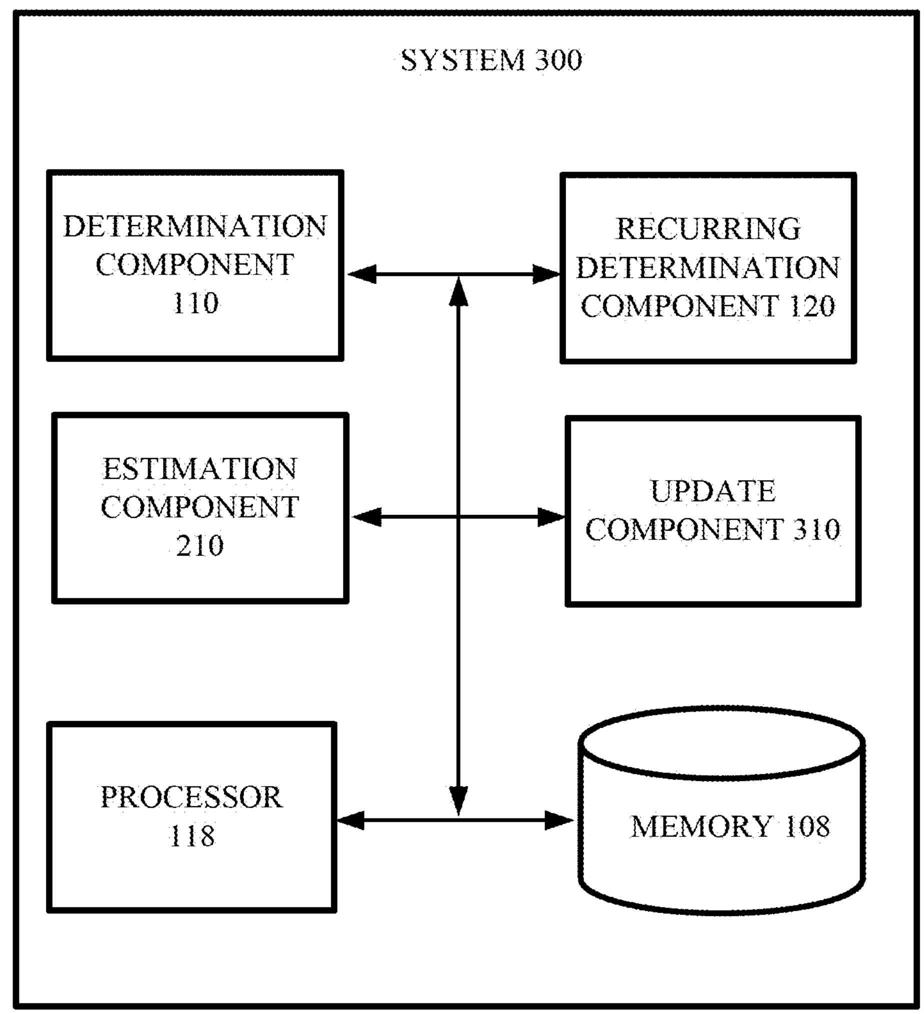
FIG. 3 illustrates another block diagram of an example, non-limiting system that facilitates updating selected first data of the initial vector in accordance with one or more embodiments described herein.

Turning now to FIG. 3, illustrated is system 300 in which connected components of a graph can be determined using incremental difference data in accordance with one or more embodiments described herein. Repetitive description of like elements employed in other embodiments described herein are omitted for sake of brevity.

The system 300 can comprise determination component 110, recurring determination component 120, estimation component 210, and update component 310 that updates the selected first data of the initial vector with the first difference data resulting in the updated initial vector. In an aspect, determination component 110 can determine connected components of a graph using a linear algebra formulation such as the brute force algorithm or incremental connected component algorithm disclosed herein. The algorithms can employ a matrix-vector multiply operation that utilizes a semi-ring {MIN, *} algebraic structure. Following the matrix-vector multiplication operation, a MIN operation can be performed on the connected component vector. Furthermore, update component 310 can update the connected component vector with the minimum of the resultant temporary vector and the connected component vector in order to update the initial connected component vector with additionally determined (e.g., using determination component 110 or recurring determination component 120) connected component data.

In an aspect, update component 310 can continue to update the connected component vector until a defined condition is met. In some embodiments, the defined condition can be there being no difference between the updated connected component vector and the copy of the initial connected component vector and thus indicating all the connected components of the graph have been identified. As such, upon determination component 110 or recurring determination component 120 determining that no difference is present between the copy of the starting connected component vector and the updated connected component vector, the recurring determination component 120 can cease to iteratively determine connected components of the graph and the iterative determination process can be stopped.

In another aspect, the determination tool can employ the matrix-vector multiply operation to combine elements of the input vector with elements of a matrix. The update component 310 can update the output vector resulting from the matrix-vector multiply operation. In a non-limiting embodiment, the estimation component 210 can estimate the sparsity of the input vector and in connection with determination component 110 determine that a few elements of the input vector are different from zero. Furthermore, the determination component 110 can determine whether the input vector is sparse prior to employing the determination tool in order to avoid accessing many of the non-zero elements of the matrix during such operation. Accordingly, any update performed by update component 310 can also avoid accessing many non-zero elements by performing a check of vector sparsity prior to performing an update to the connected component vector thereby speeding up the update time needed to perform the update.

In some embodiments, the estimation component 210 can implement an estimation algorithm that determines the estimate of the matrix non-zero elements accessed using CSC representation, where the estimation algorithm can comprise the following:

ALGORITHM (3)

```
Line 1: nonzero accessed = 0;
Line 2: for (i = 0; i<number of cols; i++)
Line 3:     if (input vec[i])
Line 4:         nonzero accessed += numEdges [i+1] − numEdges[i]
```

The Algorithm 3 can estimate the number of non-zeroes accessed from the adjacency matrix by adding the nonzero elements corresponding to the input vector. In line 1, the nonzero elements corresponding to the input vector can be initialized to zero. In line 2, the input vector (referenced as "p" in line 5 of Algorithm 1) can be tested and if the vector is determined to be different from zero (referenced as input vec[i] in line 3) for a particular column, then the number of nonzero elements of the matrix can be added in line 4. Thus the estimation algorithm employed by estimation component 210 can estimate the memory footprint required in performance of the matrix-vector multiply operation. The estimation algorithm can be employed by estimation component 210 in some architectures. Furthermore, the arrays involved in the estimation algorithm can be efficiently streamed due to its sequential access patterns.

Figure 4:
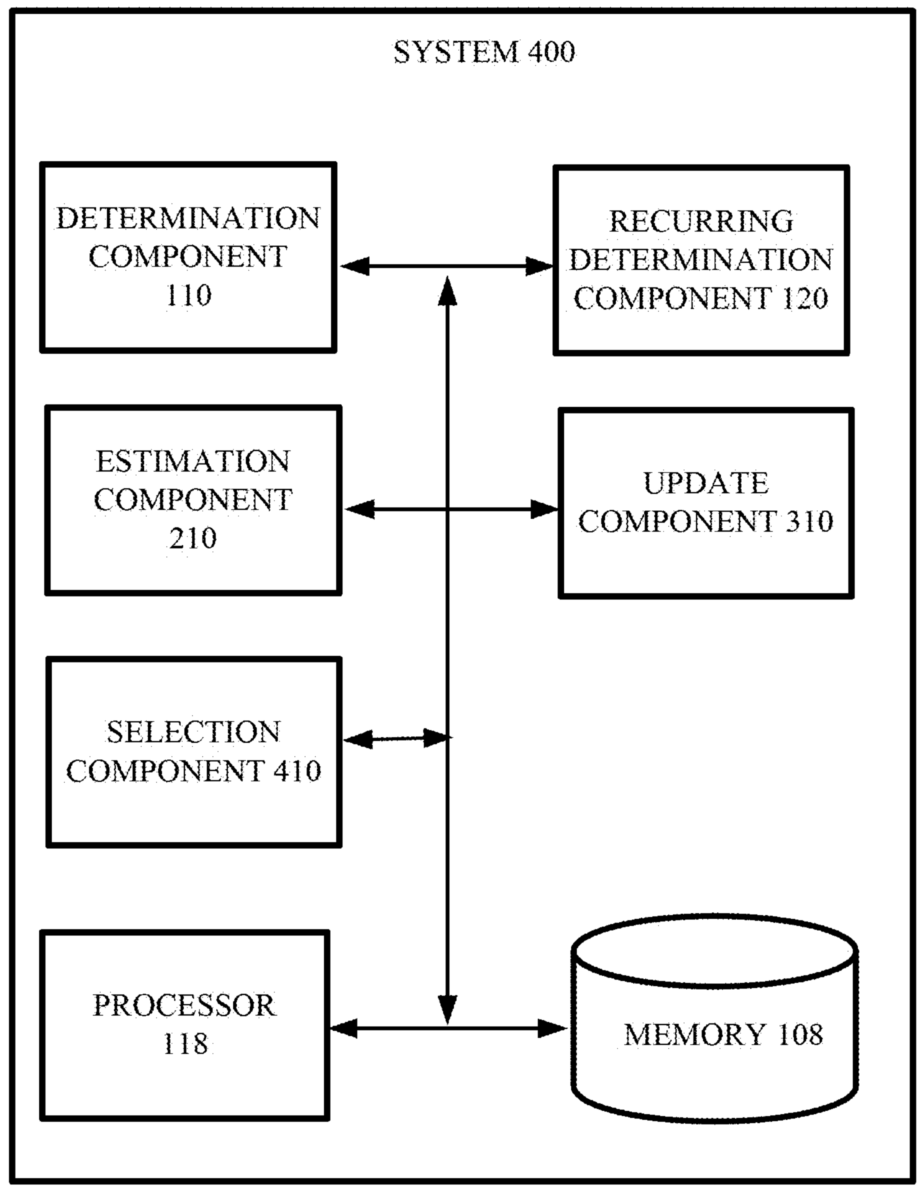
FIG. 4 illustrates another block diagram of an example, non-limiting system that facilitates selecting a determination tool based on an input vector density in accordance with one or more embodiments described herein.

Turning now to FIG. 4, illustrated is system 400 in which connected components of a graph can be determined using incremental difference data in accordance with one or more embodiments described herein. Repetitive description of like elements employed in other embodiments described herein are omitted for sake of brevity.

The system 400 can comprise determination component 110, recurring determination component 120, estimation component 210, update component 310, and selection component 410 that selects the determination tool based on an input vector density value or an aggregate density value comprising the input vector density value and a matrix density value. In an aspect, selection component 410 can select a particular determination tool based on the sparsity or density of a vector. For instance, selection component 410 can utilize a masked matrix vector multiply algorithm that utilizes a CSC storage format to represent the matrix based on an estimation (e.g., using estimation component 210) that the input vector is a sparse vector.

Furthermore, in an aspect, selection component 410 can select a determination tool (e.g., algorithm) to employ (e.g., using determination component 110 or recurring determination component 120) the matrix-vector multiply operation based on an estimation (e.g., using estimation component 210) of both the input vector density and the matrix density. By using both an estimation of an input vector density and a matrix density, selection component 410 can select a determination tool for deployment based on the characterization of both relevant inputs of the matrix-vector multiply operation. As such, in some embodiments, the selected determination tool can be best suited to both operate on the appropriate vector type (e.g., vector comprising many or few non-zero data points) and access the appropriate matrix type (e.g., matrix comprising many or few non-zero data points for access).

For instance, estimation component 210 can provide an estimation of the matrix density that can indicate the number of non-zero values that the determination tool can access to perform the matrix-vector multiply operation. Furthermore, an estimation (e.g., using estimation component 210) of the vector density can indicate how many non-zero elements of the vector can be utilized by the determination tool to perform the matrix-vector multiply operation. If the estimates by estimation component 210 indicate that the vector density is sparse and that the matrix is sparse, then selection component 410 should select a CSC matrix-vector multiply operation to efficiently perform the matrix-vector multiply operation.

As such, an adjacency matrix (e.g., representing the connectivity of the graph elements) can be best expressed in a CSC storage format and the determination tool can deploy a masked-matrix vector multiply operation to determine (e.g., using determination component 110) an output vector. The mask in a masked-matrix vector multiply operation can hold values that adjust how much influence neighboring matrix data have on the mask-matrix vector multiply operation, thus providing greater efficiencies to such operation. For instance, a mask can be useful for sharpening or blurring edge detection of respective nodes in a graph. Accordingly, in a non-limiting embodiment, selection component 410 can select a determination tool (e.g., deployed using determination component 110 or recurring determination component 120) that employs a mask matrix vector multiply operation based on whether the estimated vector density and/or the estimated matrix density is sparse.

Figure 5:
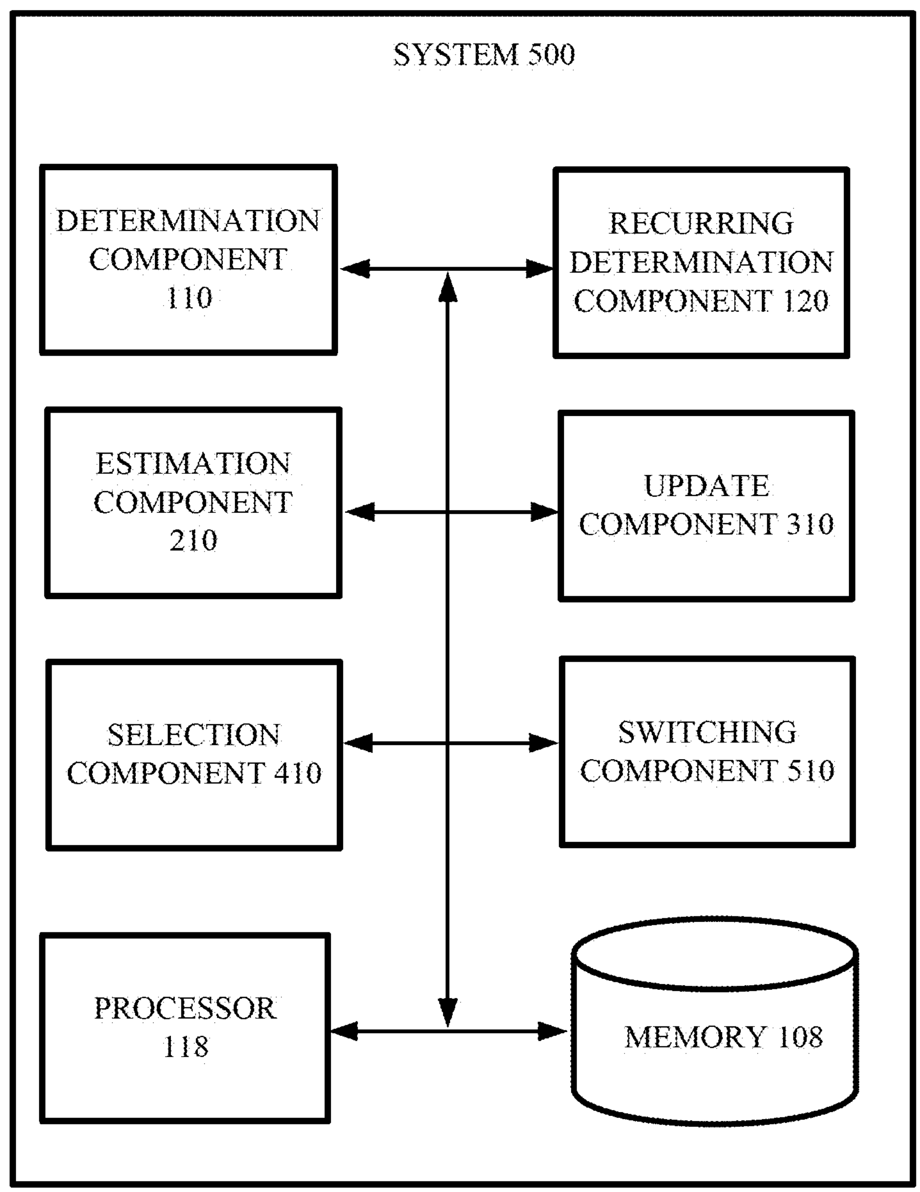
FIG. 5 illustrates another block diagram of an example, non-limiting system that facilitates switching from a first version of a determination tool to a second version of the determination tool in accordance with one or more embodiments described herein.

Turning now to FIG. 5, illustrated is system 500 in which connected components of a graph can be determined using incremental difference data in accordance with one or more embodiments described herein. Repetitive description of like elements employed in other embodiments described herein are omitted for sake of brevity.

The system 500 can comprise determination component 110, recurring determination component 120, estimation component 210, update component 310, selection component 410, and switching component 510. In an aspect, switching component 510 can switch from a first version of the determination tool to a second version of the determination tool based on a change from a first aggregate density value to a second aggregate vector density value corresponding to an input vector and an updated input vector respectively as compared to the threshold aggregate density value.

In an aspect, switching component 510 can utilize the estimation component 210 to estimate either a vector density or a matrix density to determine whether to perform the brute force algorithm or the incremental connected component algorithm based on an estimation as to the vector density or the matrix density. In some embodiments, the switching component 510 can implement the following switching algorithm that facilitates the switching from a brute force algorithm to the Algorithm 1 based on an estimate of the density of the matrix or vector using the following operations:

ALGORITHM (4)

```
Line 1 cc[i] = i+1, i=0...N-1. Initial vector of connected component
Line 2 p = 1                   Initial vector of differences
Line 3 do {
Line 4    mdensity = estimate nonzero accessed from matrix A using vector p
Line 5     If (mdensity/nonzeros> minimum} { // brute force in the dense domain
Line 6       q = cc
Line 7       cc = MIN(cc,A*{MIN,*)cc)
Line 8     } else {
Line 9        q = (p[i]==0) ? q[i]:cc[i], i=0...N-1 // optimized copy operation
Line 10       t = q*p
Line 11       cc = MIN(cc,A*{MIN,*}t)
Line 12    }
Line 13    p = (q !=cc)
Line 14 } while (p != 0)
```

As described above various algorithms (e.g., brute-force connected component algorithm or incremental connected component algorithm) can be utilized for determining connected components of a graph. During the early iterations of the determination component 110 determining connected components within a matrix the differences may be large between an initial connected component vector representing previous determinations of connected components of a graph and a current connected component vector representing previous determinations of connected components and additional connected components of a graph. Accordingly, as a result of the determination of significant differences (e.g., a large number of elements added to the graph in each early iteration) between previous connected component vectors and updated connected component vectors, a first version of the determination tool that performs a brute force vector-multiply operation may be implemented. Thus the brute force algorithm can efficiently analyze large sets of data.

For instance, the determination tool can employ a vector-multiply operation to determine the product of all elements of an input vector and all elements of a matrix. However, in later iterations of determining (e.g., using recurring determination component 120) connected components the difference between the initial connected component vector and the output connected component vector (also referred to as the current connected component) can become smaller or small (e.g., less than or equal to a defined value). Accordingly, switching component 510 can switch from a determination tool that performs the vector-matrix multiply operation on all elements of the input vector and all elements of the matrix (e.g., brute force approach) to another determination tool that performs the vector-matrix multiply operation on an incremental difference (e.g., incremental approach) between the input connected component vector and the previous connected component vector and the matrix (or specific non-zero values of the matrix).

In an aspect, switching component 510 can switch (e.g., by implementing Algorithm 4) between determination tools to facilitate an efficient and quick determination (e.g., using determination component 110 or recurring determination component 120) of connected components of a graph. Furthermore, switching component 510 can switch between a first version of the determination tool (e.g., a brute force connected component algorithm) and a second version of the determination tool (an incremental connected component algorithm) based on an estimated density of the input vector and/or the matrix. In an aspect, switching component 510 can base the switching decision on a comparison of the estimated density of the vector and/or the matrix to a threshold density.

For instance, if the estimated vector and matrix densities combined are determined to be greater than the threshold density then the aggregate density can be determined to be sufficiently dense for the determination component 110 to utilize a brute force determination tool algorithm. However, if the estimated vector and matrix densities combined are determined to be less than the threshold density then the aggregate density can be determined to be sufficiently sparse for the determination component 110 to utilize an incremental approach algorithm. By facilitating the switching between determination tools, the execution of system 500 components and access to respective data sets can be accomplished with great efficiency by processor 118 and memory 108. As a result of such switching, the early graph analysis iterations can utilize the brute force determination tool to accomplish the analysis of large volumes of data that procure large changes (e.g., a determination of many new connected components during one or more determinative iteration). Furthermore, the later graph analysis iterations can utilize the incremental determination tool that analyzes the small incremental difference in data achieved between previous graph component solutions and current graph component solutions (e.g., fewer additional connected components determined).

Figure 6:
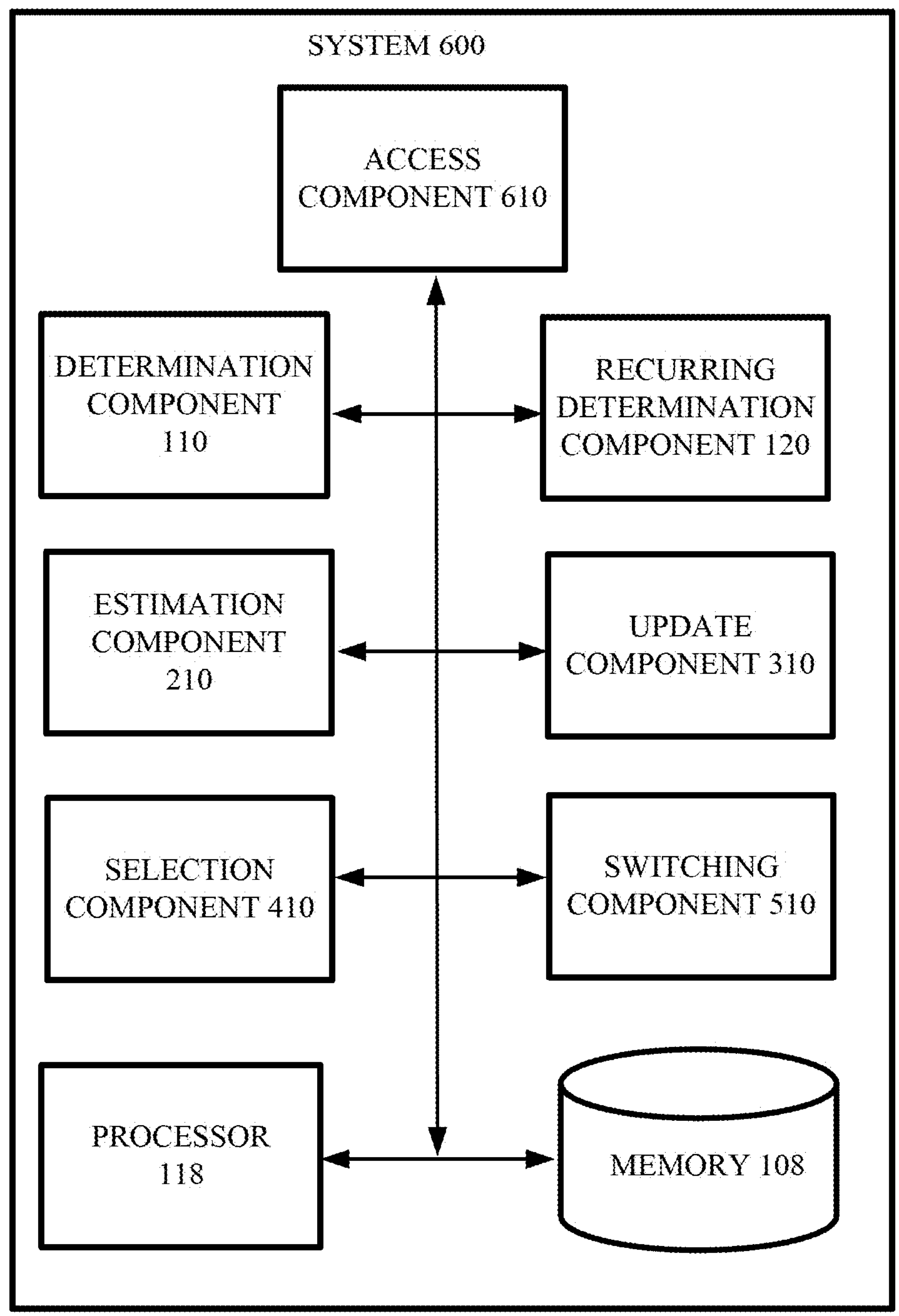
FIG. 6 illustrates a block diagram of an example, non-limiting system that facilitates accessing first difference data and second difference data in accordance with one or more embodiments described herein.

Turning now to FIG. 6, illustrated is system 600 in which connected components of a graph can be determined using incremental difference data in accordance with one or more embodiments described herein. Repetitive description of like elements employed in other embodiments described herein are omitted for sake of brevity. The system 600 can comprise determination component 110, recurring determination component 120, estimation component 210, update component 310, selection component 410, switching component 510, and access component 610 that accesses the first difference data and the second difference data in a shorter time period as compared to accessing a totality of first data and a totality of second data associated with an initial determination and a totality of third data and a totality of fourth data associated with a subsequent determination respectively.

In an aspect, access component 610 accesses the data associated with the input vector and the matrix with greater speed and efficacy using the incremental difference algorithm rather than a non-incremental algorithm. The connectivity of connected component graphs can be highly irregular. As such, accessing large sets of graph node data or edge data induce memory access patterns presenting spatial and/or temporal locality issues of respective data in memory locations associated with respective memory addresses. However, access component 610 accesses incremental difference data which can be devoid of many erroneous data points such as irrelevant zero values thus allowing for efficient access to data.

Furthermore, the incremental algorithm employed by the determination tool can also utilize input vector data and matrix data that include relevant non-zero values and fewer non-zero values to both speed up the vector-matrix multiply operation and allow for easier access to data (e.g., using access component 610). Accordingly, access component 610 reduces cache misses and address translation misses when accessing data using the incremental difference algorithm as compared to traditional connected component algorithms Thus, the entire system operations including data access (e.g., using access component 610) from memory tasks result in better performance and efficient sequential access patterns of vector data and matrix data.

Figure 7:
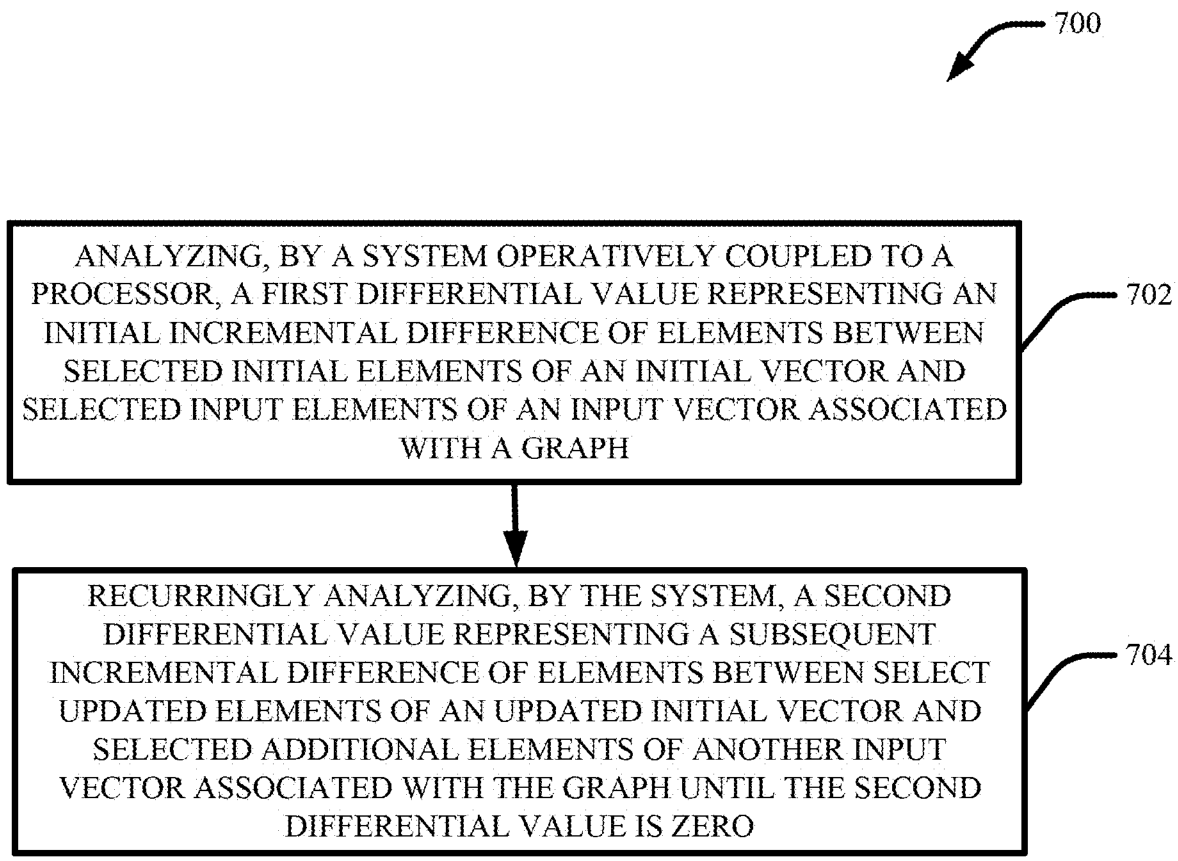
FIG. 7 illustrates an example, non-limiting computer-implemented method that facilitates analyzing a first differential value between elements of an initial vector and an input vector in accordance with one or more embodiments described herein.

FIG. 7 illustrates a flow diagram of an example, non-limiting computer-implemented method 700 that facilitates determining connected components of a graph using difference data between a connected component vector and an updated connected component vector in accordance with one or more embodiments described herein. Repetitive description of like elements employed in other embodiments described herein are omitted for sake of brevity.

At reference numeral 702, a system (e.g., system 100) can analyze (e.g., using determination component 110) a first differential value by a system operatively coupled to a processor (e.g. processor 118), wherein the first differential value represents an initial incremental difference of elements between selected initial elements of an initial vector and selected input elements of an input vector associated with a graph. At reference numeral 704, the system can recurringly analyze (e.g., using recurring determination component 120) a second differential value, wherein the second differential value represents a subsequent incremental difference of elements between selected updated elements of an updated initial vector and selected additional elements of another input vector associated with the graph until the second differential value is zero.

Figure 8:
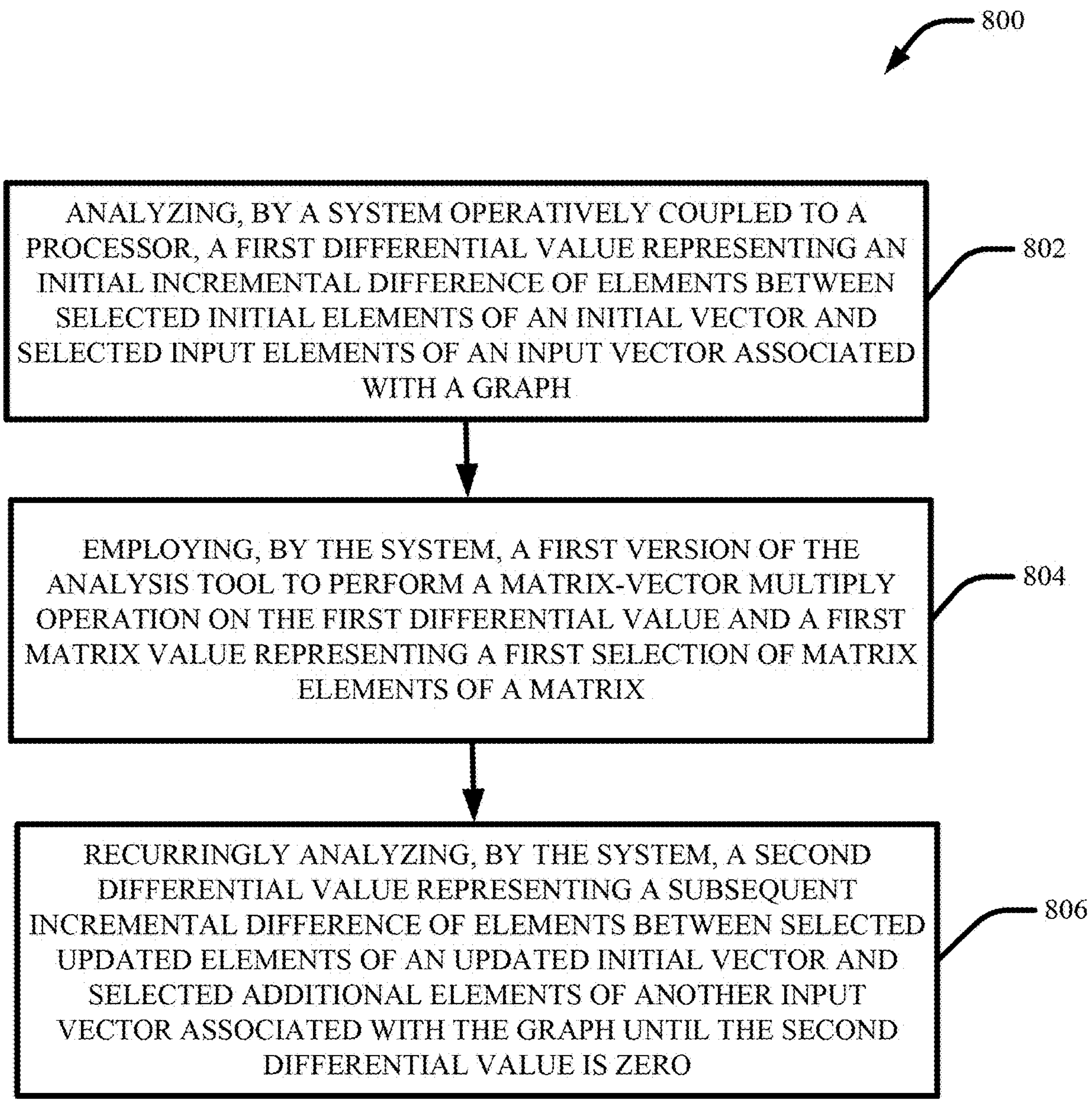
FIG. 8 illustrates an example, non-limiting computer-implemented method that facilitates performing a matrix-vector multiply operation on a first differential value and a matrix value in accordance with one or more embodiments described herein.

FIG. 8 illustrates a flow diagram of an example, non-limiting computer-implemented method 800 that facilitates determining connected components of a graph using difference data between a connected component vector and an updated connected component vector in accordance with one or more embodiments described herein. Repetitive description of like elements employed in other embodiments described herein are omitted for sake of brevity.

At reference numeral 802, a system (e.g., system 100) can analyze (e.g., using determination component 110) a first differential value by a system operatively coupled to a processor (e.g. processor 118), wherein the first differential value represents an initial incremental difference of elements between selected initial elements of an initial vector and selected input elements of an input vector associated with a graph. At 804, the system can employ a first version of the analysis tool (e.g., using a determination tool of determination component 110) to perform a matrix-vector multiply operation on the first differential value and a first matrix value representing a first selection of matrix elements of a matrix. At reference numeral 806, the system can recurringly analyze (e.g., using recurring determination component 120) a second differential value, wherein the second differential value represents a subsequent incremental difference of elements between selected updated elements of an updated initial vector and selected additional elements of another input vector associated with the graph until the second differential value is zero.

Figure 9:
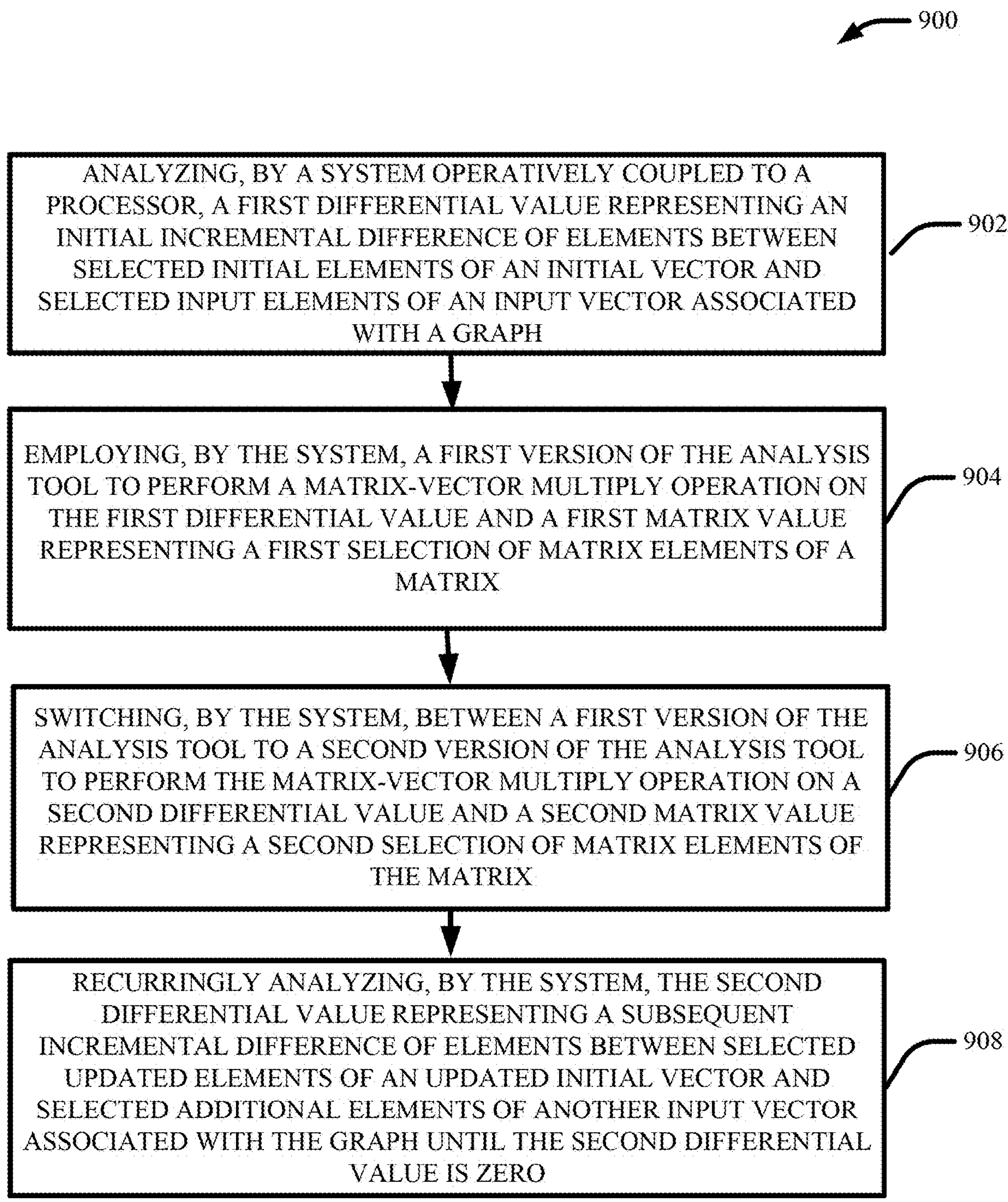
FIG. 9 illustrates an example, non-limiting computer-implemented method that facilitates switching between a first version and a second version of an analysis tool in accordance with one or more embodiments described herein.

FIG. 9 illustrates a flow diagram of an example, non-limiting computer-implemented method 900 that facilitates determining connected components of a graph using difference data between a connected component vector and an updated connected component vector in accordance with one or more embodiments described herein. Repetitive description of like elements employed in other embodiments described herein are omitted for sake of brevity.

At reference numeral 902, a system (e.g., system 500) can analyze (e.g., using determination component 110) a first differential value by a system operatively coupled to a processor (e.g. processor 118), wherein the first differential value represents an initial incremental difference of elements between selected initial elements of an initial vector and selected input elements of an input vector associated with a graph. At 904, the system can employ a first version of the analysis tool (e.g., using a determination tool of determination component 110) to perform a matrix-vector multiply operation on the first differential value and a first matrix value representing a first selection of matrix elements of a matrix. At 906, the system can switch (e.g., using switching component 510) from the first version of the analysis tool to a second version of the analysis tool to perform the vector multiply operation on the first differential value and a second matrix value representing a second selection of matrix elements of the matrix. At reference numeral 908, the system can recurringly analyze (e.g., using recurring determination component 120) a second differential value, wherein the second differential value represents a subsequent incremental difference of elements between selected updated elements of an updated initial vector and selected additional elements of another input vector associated with the graph until the second differential value is zero.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because a determination of connected components of a graph is determined by components executed by a processor (e.g., processor 118) established from a combination of electrical and mechanical components and circuitry, a human is unable to replicate or perform the subject data packet configuration and/or the subject communication between processing components and/or a determination component. Furthermore, incremental data associated with a vector and a matrix is accessed from a memory (e.g., using memory 108) where such access patterns (irregular access patterns associated with a sparse graph) a human is unable to replicate. For example, a human is unable to switch from a first version of the determination tool to a second version of the determination tool and/or process a sequence of instructions (e.g., vector data and matrix data) associated with a sequence of bits. Furthermore, a human is unable to communicate data and/or packetized data for communication between a main processor (e.g., using processor 118) and a memory (e.g., memory 108).

Figure 10:
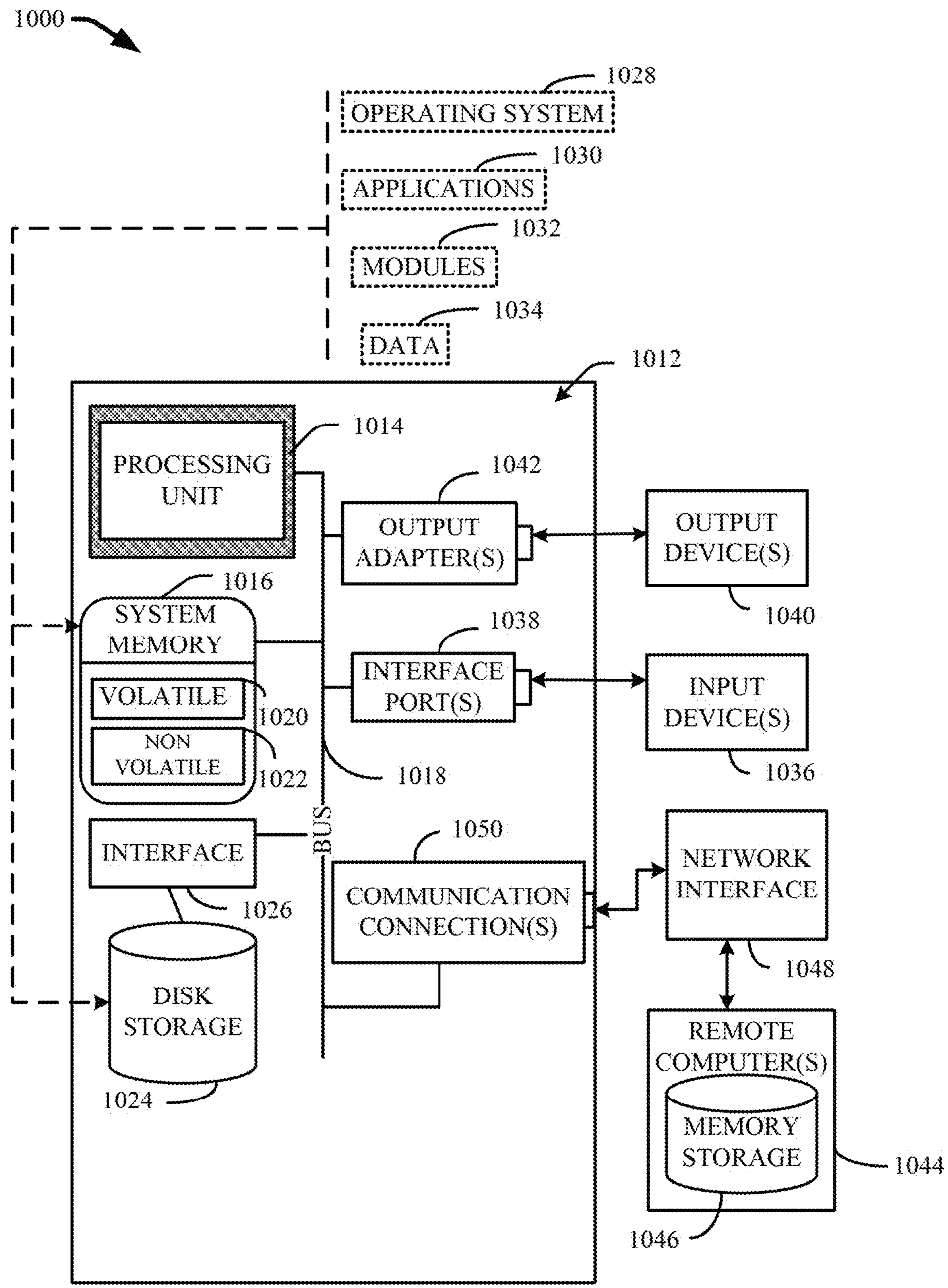
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that one or more block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for efficiently applying matrix representation, the computer program product comprising a computer readable storage medium having program instructions embodied therewith, the program instructions executable by a processor to cause the processor to:

determine connected components of a graph using a determination tool that performs a matrix-vector multiply operation on a first set of values of an intermediate vector and a second set of values of a matrix, wherein the first set of values represent a first incremental difference between selected first elements of a first vector associated with a first connected component solution for the graph and selected second elements of a second vector associated with a second connected component solution for the graph; and iteratively determine additional connected components of the graph using the determination tool that performs the matrix-vector multiply operation on a third set of values of another intermediate vector and the second set of values of the matrix, wherein the third set of values represent a second incremental difference between selected updated elements of an updated first vector associated with a previous connected component solution for the graph determined during a previous iteration and selected third elements of a third vector associated with a third connected component solution for the graph determined during a current iteration, and wherein the iterative determination is performed until the third set of values satisfy a defined condition.

2. The computer program product of claim 1, wherein the program instructions are further executable by the processor to cause the processor to:

estimate a vector density of the third vector, wherein an estimated vector density is represented by a vector density value and corresponds to a number of non-zero values associated with the third vector as a function of a number of elements that comprises the selected third elements.

3. The computer program product of claim 2, wherein the program instructions are further executable by the processor to cause the processor to:

estimate a matrix density corresponding to a number of matrix values of the matrix accessed by the determination tool, wherein an estimated matrix density is represented by an estimated matrix density value.

4. The computer program product of claim 2, wherein the program instructions are further executable by the processor to cause the processor to:

select between a first version of the determination tool or a second version of the determination tool based on the vector density value, wherein the first version of the determination tool performs the matrix-vector multiply operation on dense vectors, and wherein the second version of the determination tool performs the matrix-vector multiply operation on sparse vectors.

5. The computer program product of claim 4, wherein the program instructions are further executable by the processor to cause the processor to:

select the first version of the determination tool if the vector density value is greater than or equal to a first threshold value or select the second version of the determination tool if the vector density value is less than the first threshold value.

6. The computer program product of claim 3, wherein the program instructions are further executable by the processor to cause the processor to:

select between a first version of the determination tool or a second version of the determination tool based on an aggregate density value of the vector density value and the estimated matrix density value.

7. The computer program product of claim 6, wherein the program instructions are further executable by the processor to cause the processor to:

select the first version of the determination tool if the aggregate density value is greater than or equal to a second threshold value or select the second version of the determination tool if the aggregate density value is less than the second threshold value.

8. The computer program product of claim 7, wherein the program instructions are further executable by the processor to cause the processor to:

switch from using the first version of the determination tool that compares a totality of first elements of the first vector to a totality of second elements of the second vector to the second version of the determination tool that compares the selected first elements to the selected second elements based on the aggregate density value being greater than the second threshold value.

9. The computer program product of claim 1, wherein the third set of values satisfying the defined condition comprises the third set of values being zero.

10. A system comprising:

a memory that stores computer executable components;

a processor that executes computer executable components stored in the memory, wherein the computer executable components comprise:

a determination component that determines connected components of a graph using a determination tool that performs a matrix-vector multiply operation on a first value of a temporary vector and a second value of a matrix, wherein the first value represents first difference data between selected first data of an initial vector associated with an initial connected component solution for the graph and selected second data of an input vector associated with a second connected component solution for the graph; and a recurring determination component that iteratively determines additional graph data using the determination tool that performs the matrix-vector multiply operation on a third value of another temporary vector and the second value of the matrix, wherein the third value represents second difference data between selected third data of an updated initial vector associated with a previous connected component solution for the graph determined during a previous iteration and selected fourth data of a subsequent input vector associated with a subsequent connected component solution for the graph during a current iteration until the third value is zero.

11. The system of claim 10, further comprising an estimation component that estimates a vector density value representing a vector density of the subsequent input vector, wherein the vector density represents a number of non-zero values associated with the subsequent input vector as a function of a number of elements corresponding to the subsequent input vector.

12. The system of claim 10, further comprising an update component that updates the selected first data of the initial vector with the first difference data resulting in the updated initial vector.

13. The system of claim 10, further comprising a selection component that selects the determination tool based on an input vector density value or an aggregate density value comprising the input vector density value and a matrix density value.

14. The system of claim 13, wherein the selection component further selects the determination tool based on the input vector density value being greater than or less than a threshold density value or the aggregate density value being greater than or less than a threshold aggregate density value.

15. The system of claim 14, further comprising a switching component that switches from a first version of the determination tool to a second version of the determination tool based on a change from a first aggregate density value to a second aggregate vector density value corresponding to an input vector and an updated input vector respectively as compared to the threshold aggregate density value.

16. The system of claim 10, further comprising an access component that accesses the first difference data and the second difference data in a shorter time period as compared to accessing a totality of first data and a totality of second data associated with an initial determination and a totality of third data and a totality of fourth data associated with a subsequent determination respectively.

17. The system of claim 15, wherein the processor further executes components of the system within a first time period using the second version of the determination tool as compared to within a second time period using the first version of the determination tool upon the aggregate density value being less than the threshold aggregate density value, wherein the first time period is less than the second time period.

18. A computer-implemented method, comprising:

analyzing, by a system operatively coupled to a processor, a first differential value representing an initial incremental difference of elements between selected initial elements of an initial vector associated with an initial connected component solution for a graph and selected input elements of an input vector associated with a second connected component solution for the graph; and iteratively analyzing, by the system, a second differential value representing a subsequent incremental difference of elements between selected updated elements of an updated initial vector associated with a previous connected component solution for the graph determined during a previous iteration and selected additional elements of another input vector associated with another connected component solution for the graph determined during a current iteration until the second differential value is zero.

19. The computer-implemented method of claim 18, further comprising employing, by the system, a first version of an analysis tool to perform a matrix-vector multiply operation on the first differential value and a first matrix value representing a first selection of matrix elements of a matrix.

20. The computer-implemented method of claim 19, further comprising switching, by the system, between the first version of the analysis tool to a second version of the analysis tool to perform the matrix-vector multiply operation on the second differential value and a second matrix value representing a second selection of matrix elements of the matrix.

* * * * *